No. 838,094. PATENTED DEC. 11, 1906.
E. B. FARGO.
CAR AXLE JOURNAL BOX.
APPLICATION FILED NOV. 4, 1904.
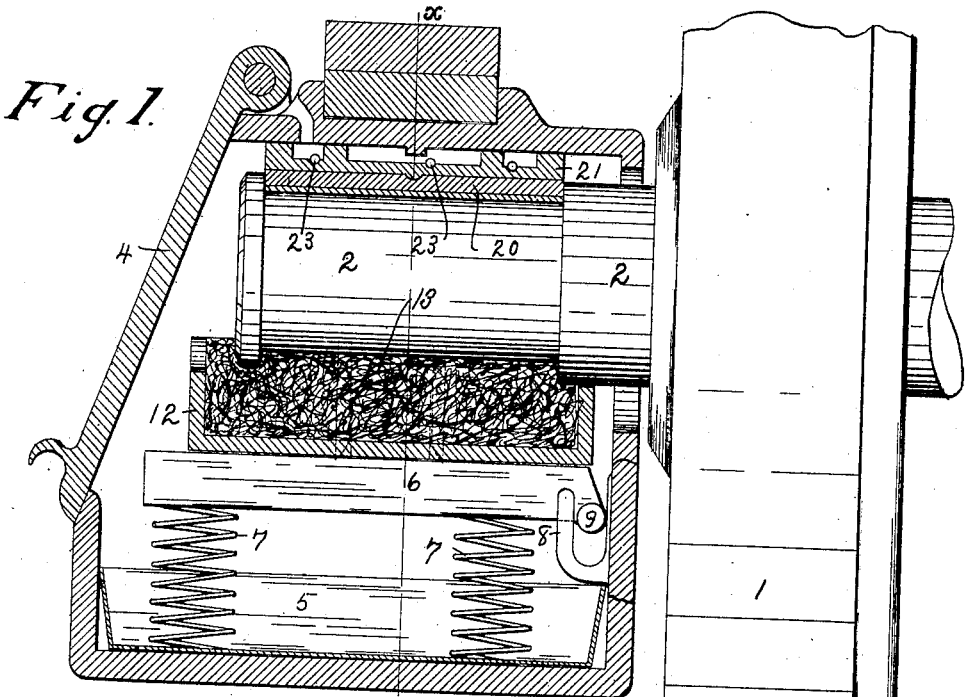
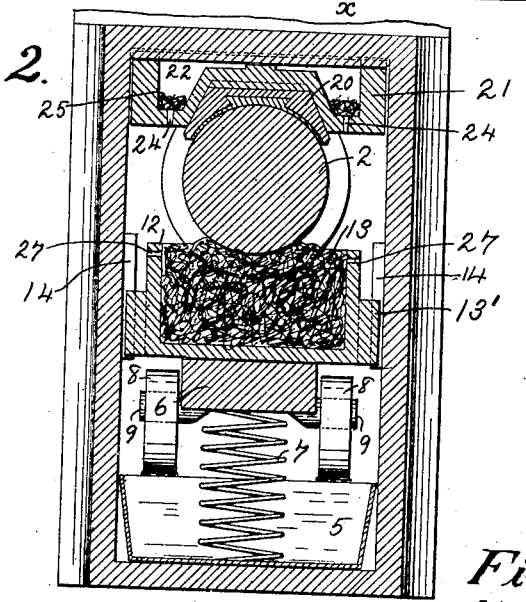
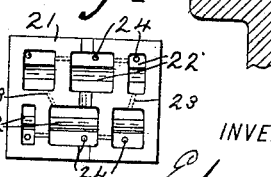
WITNESSES:
INVENTOR
Edward B. Fargo
BY Erwin E. Wheeler
ATTORNEYS

UNITED STATES PATENT OFFICE.

EDWARD B. FARGO, OF MATTOON, WISCONSIN, ASSIGNOR OF TWO-THIRDS TO JOHN H. RADKE AND H. L. EATON, OF MILWAUKEE, WISCONSIN.

CAR-AXLE JOURNAL-BOX.

No. 838,094.　　　Specification of Letters Patent.　　　Patented Dec. 11, 1906.

Application filed November 4, 1904. Serial No. 231,353.

*To all whom it may concern:*

Be it known that I, EDWARD B. FARGO, a citizen of the United States, residing at Mattoon, county of Shawano, and State of Wisconsin, have invented new and useful Improvements in Car-Axle Journal-Boxes, of which the following is a specification.

My invention relates to improvements in car-axle journal-boxes.

The object of my invention is to provide means for more effectually lubricating the journal and for readily removing the pan containing the waste and replacing the same with a new pan whenever the journal becomes heated and when the waste becomes hard after a period of use.

My invention also has regard for certain details of construction hereinafter pointed out and claimed.

In the following description reference is had to the accompanying drawings, in which—

Figure 1 is a view of a portion of a car-wheel axle, showing the journal-box in vertical section on the center line of the axle. Fig. 2 is a transverse sectional view of the box drawn on line X X of Fig. 1. Fig. 3 is a plan view of the removable waste-containing pan with the projections 13' omitted. Fig. 4 is a detail plan view of the bearing-frame in which the brass is located.

Like parts are identified by the same reference characters throughout the several views.

1 is a car-wheel, and 2 the axle. The walls of the box are provided with a hinged lid 4, permitting access to the interior. An oil-receiving pan 5 is located in the bottom of the box, and a platform 6 is supported by springs 7, extending upwardly from the bottom of the pan, as shown. Hooks 8, projecting from the side of the box, engage studs 9 on the platform 6, permitting a vertical movement of the platform, but holding it from shifting laterally.

The platform 6 supports a waste-containing pan 12, which is filled with a supply of waste 13 and is pushed upwardly in the direction of the axle 2 by the springs 7. The sides of the pan 12 are provided with projections 13', which are engaged between suitable guides 14 on the sides of the box, whereby the pan is permitted to move vertically, but is prevented from sliding on the platform 6. When it is desired to remove the pan, however, pressure may be applied to the platform 6 to compress the springs 7 until the pan 12 or its projections 13 are depressed below the guides 14, when the pan may be drawn out and removed through the opening covered by the lid 4. The brass 20 is held in position by a retaining-frame 21. This frame is provided with a series of cavities 22, connected with each other by cross-ducts 23 and having apertures 24, leading downwardly through the frame and adapted to permit the passage of oil from the cavities 22 to the axle and to the waste in the pan 12. A small quantity of felt 25 is placed in the cavities 22 in order to retard the flow of the oil through the apertures 24. With this arrangement it is not necessary that a large supply of oil should be contained in the pan 12, and I am therefore enabled to use a shallow pan which can be readily inserted and removed from a box of ordinary construction and supported within the box by the springs 7.

Referring to Fig. 3, it will be observed that the pan 12 is provided with a series of cords 26, which cover the waste 13 and hold it in the pan. These cords are preferably passed through apertures 27 in the sides of the pan and knotted to secure them in position. The object of the cords is to prevent the fresh waste from winding upon the shaft. By the time the cords have worn out the waste will be sufficiently compressed and packed to prevent it from winding.

Having thus described my invention, what I claim as new, and desire to secure by Letters Patent, is—

1. In a device of the described class, the combination with a car-axle; of a casing mounted thereon; a vertically-movable platform within the casing; a waste-containing pan mounted on the platform; a resilient support for the platform; guides for the pan, adapted to release it when depressed below normal position; and guides for the platform adapted to release it when elevated above normal position.

2. In a device of the described class, the combination with a car-axle; of a casing mounted thereon; a vertically-movable platform, and a resilient support therefor mounted within the casing; a waste-containing pan mounted on the platform and provided with a filling of waste bearing against the car-axle; and a series of cords connected with the pan and extended over the upper surface of the waste.

3. In a device of the described class, the combination with a car-axle; of a casing mounted thereon; a vertically-movable platform mounted on a resilient support within the casing; a waste-containing pan mounted on the platform; a frame in the upper portion of the casing provided with interconnected oil-receiving cavities, and having perforations leading through the bottom of the frame from the cavities and adapted to permit oil to drip therefrom to the axle and waste-containing pan.

In testimony whereof I affix my signature in the presence of two witnesses.

EDWARD B. FARGO.

Witnesses:
LEVERETT C. WHEELER,
JAS. B. ERWIN.